United States Patent [19]
Dassero et al.

[11] Patent Number: 5,371,563
[45] Date of Patent: Dec. 6, 1994

[54] ELECTRONIC FLASH UNIT WITH TRIGGERING CIRCUIT AFFIXED TO REFLECTOR

[75] Inventors: William F. Dassero, Rochester; John A. Marino, Conesus, both of N.Y.

[73] Assignee: Eastman Kodak Company, Rochester, N.Y.

[21] Appl. No.: 180,733

[22] Filed: Jan. 13, 1994

[51] Int. Cl.5 .............................................. G03B 15/03
[52] U.S. Cl. ............................ 354/145.1; 354/149.11
[58] Field of Search ............. 354/145.1, 149.11, 149.1; 315/241 B

[56] References Cited

U.S. PATENT DOCUMENTS

| | | | |
|---|---|---|---|
| D. 306,036 | 2/1990 | Nakayama | D16/209 |
| 4,319,818 | 3/1982 | Sawara | 354/145 |
| 4,350,420 | 9/1982 | Engelsmann et al. | 354/145 |
| 4,496,311 | 1/1985 | Armstrong | 431/359 |
| 4,557,571 | 12/1985 | Reibl | 354/149.11 |
| 4,796,034 | 1/1989 | Leonard et al. | 354/145.1 |
| 4,853,723 | 8/1989 | Akabane et al. | 354/145.1 |
| 4,941,070 | 7/1990 | Ogawa et al. | 354/199.1 |
| 4,945,368 | 7/1990 | Ishino et al. | 354/149.11 |
| 5,066,966 | 11/1991 | Kawano | 354/82 |
| 5,146,251 | 9/1992 | Ishii et al. | 354/145.1 |

FOREIGN PATENT DOCUMENTS 56-162731  12/1981  Japan ........................ G03B 15/05

*Primary Examiner*—Michael L. Gellner
*Assistant Examiner*—Nicholas J. Tuccillo
*Attorney, Agent, or Firm*—Roger A. Fields

[57] ABSTRACT

An electronic flash unit has a printed circuit board (which comprises the flash trigger circuit) that is affixed to the rear of a parabolic-shaped flash reflector to conserve space.

1 Claim, 2 Drawing Sheets

ELECTRONIC FLASH UNIT WITH TRIGGERING CIRCUIT AFFIXED TO REFLECTOR

FIELD OF THE INVENTION

The invention relates generally to the field of photography, and in particular to electronic flash construction.

BACKGROUND OF THE INVENTION

Compact cameras with an electronic flash unit that flips up from the camera body for picture-taking have recently become popular. Elevating the flash unit above the camera body tends to substantially avoid the phenomenon known as "red-eye", because of the resulting increase in the separation between the flash unit and the camera's taking lens. When using the flash unit and color print film, red-eye is typified by the pupils of a person who is photographed being red-tinted on a color print. This is attributable to the incidence into the taking lens of the red light reflected from the person's eyes illuminated by the flash light. Thus, increasing the separation between the flash unit and the taking lens makes the flash light reach the person's eyes at too great an angle to be reflected into the taking lens.

Typically, in compact cameras with a flip-up flash device, the flash electronics is located in the camera body. Consequently, any electronic "noise" which is generated by one or more components of the flash circuit might adversely affect performance of the camera electronics, such as an integrated circuit for light measurement and exposure control, located in the camera body.

Prior art U.S. Pat. No. 4,853,723, issued Aug. 1, 1989, suggests locating the trigger coil of a flash circuit in a hollow arm of the support frame of a flip-up flash unit. This is done to move the trigger coil away from the camera body when the flash device is flipped up to increase its separation from the taking lens. Moving the trigger coil away from the camera body advantageously isolates electronic noise generated by the trigger coil from camera electronics located in the camera body.

PROBLEM TO BE SOLVED BY THE INVENTION

Locating the trigger coil of a flash circuit in a hollow arm of the support frame of a flip-up flash unit as suggested by prior art U.S. Pat. No. 4,853,723 requires that the volume of the hollow arm be sufficiently enlarged to house the trigger coil. This works against achieving desired camera compactness.

SUMMARY OF THE INVENTION

According to one aspect of the invention, an electronic flash unit comprising a flash head which contains a flash tube mounted in a trough-shaped reflector that is open at its front and closed at its rear to reflect flash illumination outwardly towards a subject to be photographed, and a neck-like portion which carries the flash head to elevate it from a camera body, is characterized in that:

an electronic circuit board for various flash circuit components is affixed to the rear of the reflector within the flash head.

According to another aspect of the invention, the reflector is substantially curved at its rear, and the circuit board is similarly curved to conform to the reflector.

ADVANTAGEOUS EFFECT OF THE INVENTION

Since the flash circuit is affixed to the reflector within the flash head, otherwise ignored space is used. As a result, further camera compactness can be achieved.

DETAILED DESCRIPTION OF THE INVENTION

The invention is disclosed as being embodied preferably in a compact camera with a flip-up flash unit. Because the features of this type camera are generally known as exemplified by prior art U.S. Pat. Nos. 4,350,420, issued Sep. 21, 1982, and No. Des. 306,036, issued Feb. 13, 1990, (incorporated in this application), the description which follows is directed in particular only to those elements forming part of or cooperating directly with the disclosed embodiment. It is to be understood, however, that other elements may take various forms known to a person of ordinary skill in the art.

Figure 1:
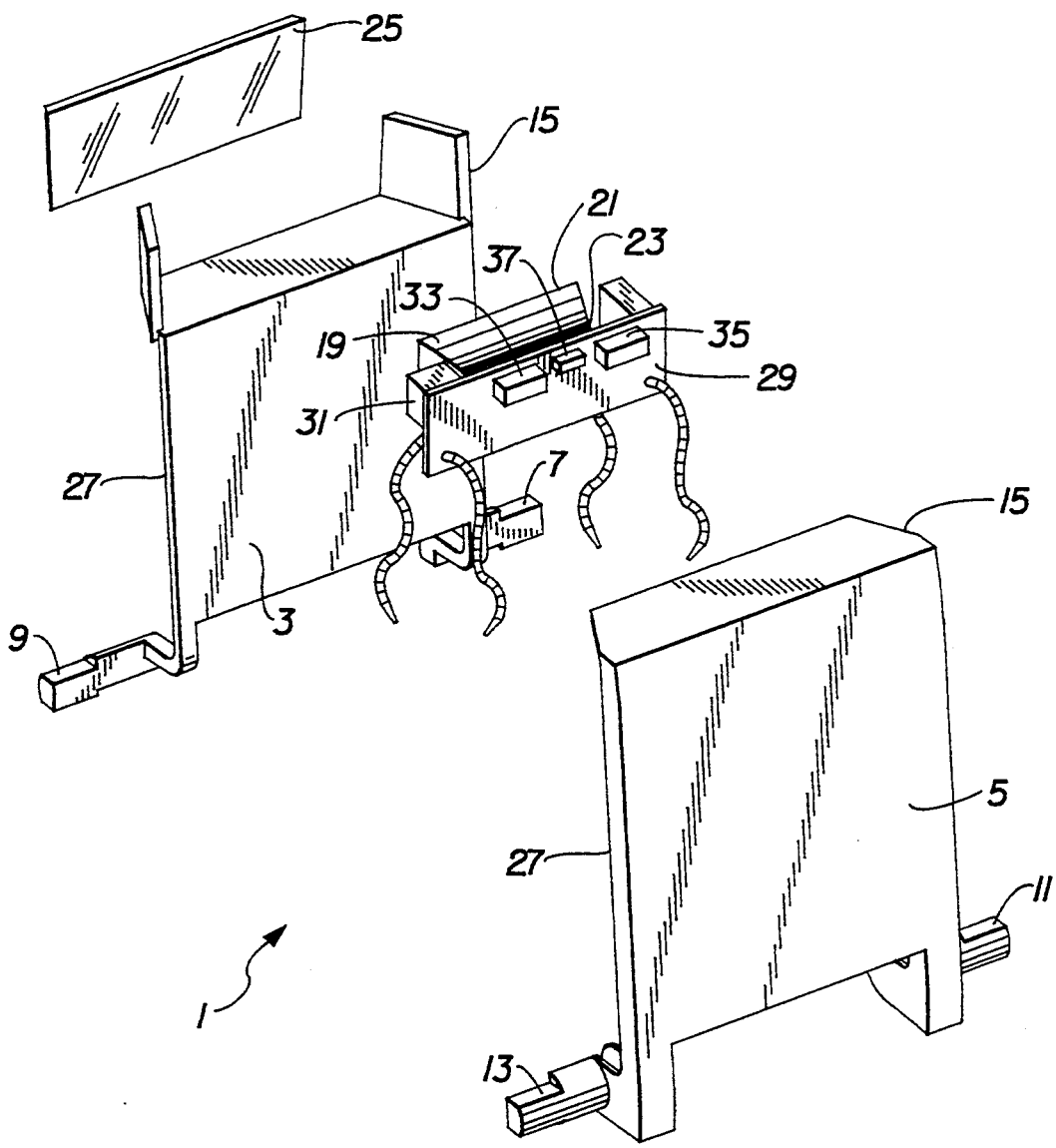
FIG. 1 is an exploded rear elevation view of an electronic flash unit according to a preferred embodiment of the invention.
Figure 2:
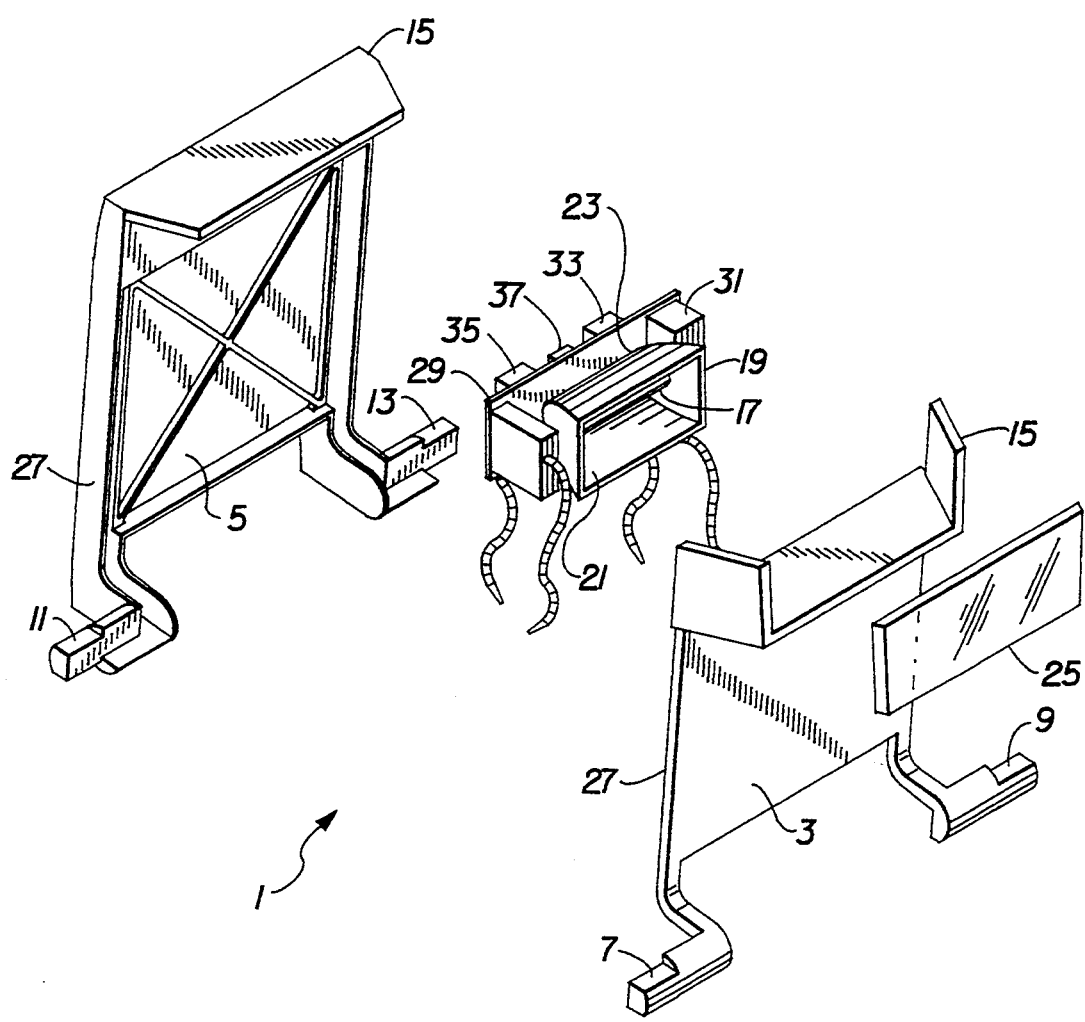
FIG. 2 is an exploded front view of the electronic flash unit depicted in FIG. 1.

Referring now to the drawings, FIGS. 1 and 2 show an electronic flash unit 1 having a flash casing consisting of a front half 3 and a rear half 5. The front and rear halves 3 and 5 each include an integral pair of aligned post halves 7, 9 and 11, 13 which when the front and rear halves are connected combine to form two aligned pivot posts that are connected to a camera body, such as shown in the incorporated U.S. Pat. Nos. 4,350420 and Des. 306,036, to support the flash unit 1 to be flipped up and flipped down with respect to the camera body.

The front and rear halves 3 and 5 of the flash unit 1 when connected are configured to form a flash head 15 which contains a known flash tube 17 mounted in a known parabolic-shaped reflector 19 that is open at its front 21 and closed at its rear 23 to reflect flash illumination from the flash tube outwardly through a front cover glass 25 for the reflector. A neck-like or supporting portion 27 of the front and rear halves 3 and 5, which is flat and is substantially thinner than the flash head 15, carries the flash head as can be appreciated by looking at FIGS. 1 and 2.

A printed circuit board 29, which is the flash trigger circuit, includes conventional trigger components such as a trigger coil 31, a trigger capacitor 33, an SCR (silicon control rectifier) 35, and an SCR gate capacitor 37. The circuit board 29 is affixed to the rear 23 of the reflector 19 by a suitable adhesive as shown in FIGS. 1 and 2.

The invention has been described with reference to a preferred embodiment. However, it will be appreciated that variations and modifications can be effected by a person of ordinary skill in the art without departing from the scope of the invention. For example, the circuit board 29, instead of being rigid can be the known flexible type. This would allow the circuit board 29 to be curved to conform to the rear 23 of the reflector 19 when it is affixed to the reflector.

PARTS LIST FOR FIGS. 1–2

1. electronic flash unit
3 & 5. front and rear halves of flash casing 7, 9 & 11, 13 pair of post halves
15. flash head
17. flash tube
19. flash reflector
21. reflector front
23. reflector rear
25. cover glass
27. neck-like or supporting portion
29. printed circuit board
31. trigger coil
33. trigger capacitor
35. SCR
37. SCR gate capacitor

What is claimed is:

1. An electronic flash unit comprising a flash head which contains a flash tube mounted in a trough-shaped reflector that is open at its front and closed at its rear to reflect flash illumination outwardly towards a subject to be photographed, and a neck-like portion which carries said flash head to elevate it from a camera body, is characterized in that:
an electronic circuit board for various flash circuit components is affixed to the rear of said reflector within said flash head, said reflector is substantially curved at its rear and said circuit board is similarly curved to conform to the reflector.

* * * * *